United States Patent
Godfrey et al.

(10) Patent No.: US 10,216,068 B2
(45) Date of Patent: Feb. 26, 2019

(54) CAMERA AND TASK LIGHT ON ADJUSTABLE ARM AND WEIGHTED BASE

(71) Applicant: Lenovo (Singapore) Pte. Ltd., Singapore (SG)

(72) Inventors: Cyan Godfrey, Chapel Hill, NC (US); Ali Kathryn Ent, Raleigh, NC (US); Peter Carlson Rane, Cary, NC (US); Thomas Perelli, Raleigh, NC (US); Matthew Ian Tucker, Durham, NC (US); Samuel Jackson Patterson, Raleigh, NC (US)

(73) Assignee: Lenovo (Signapore) Pte. Ltd., Singapore (SG)

(*) Notice: Subject to any disclaimer, the term of this patent is extended or adjusted under 35 U.S.C. 154(b) by 43 days.

(21) Appl. No.: 15/051,396

(22) Filed: Feb. 23, 2016

(65) Prior Publication Data
US 2017/0242322 A1    Aug. 24, 2017

(51) Int. Cl.
G03B 17/56 (2006.01)
F21V 33/00 (2006.01)
H04N 5/225 (2006.01)
F21V 21/26 (2006.01)

(52) U.S. Cl.
CPC ........ G03B 17/561 (2013.01); F21V 33/0052 (2013.01); H04N 5/2251 (2013.01); F21V 21/26 (2013.01)

(58) Field of Classification Search
CPC ... G03B 17/561; F21V 21/26; F21V 33/0052; H04N 13/0203; F21Y 2115/01
See application file for complete search history.

(56) References Cited

U.S. PATENT DOCUMENTS

| | | | | |
|---|---|---|---|---|
| 4,530,584 A | * | 7/1985 | Schmidt | F16M 11/28 248/176.1 |
| 4,657,220 A | * | 4/1987 | Lindsay | B66F 11/048 248/647 |
| 5,012,348 A | * | 4/1991 | Witzel | H04N 7/142 348/373 |
| 5,318,257 A | * | 6/1994 | Tani | F16M 11/10 248/125.1 |
| 6,323,902 B1 | * | 11/2001 | Ishikawa | G06F 1/1607 248/918 |
| 8,152,389 B1 | * | 4/2012 | Lammens | F16M 11/10 396/419 |
| 8,602,662 B1 | * | 12/2013 | Mans | F16M 11/041 248/160 |
| 9,377,156 B2 | * | 6/2016 | Wong | F16M 11/14 |
| 9,661,197 B2 | * | 5/2017 | Clearman | G03B 17/561 |
| 9,681,029 B2 | * | 6/2017 | Harrison | H04N 5/2252 |
| 2003/0025827 A1 | * | 2/2003 | Zadok | F16M 13/04 348/375 |

(Continued)

*Primary Examiner* — Christopher Stanford
*Assistant Examiner* — Asifa Habib
(74) *Attorney, Agent, or Firm* — Ference & Associates LLC

(57) ABSTRACT

One embodiment provides an apparatus, including: an arm; a head that attaches to the arm; the head comprising a camera; and a base attached to the arm; the base including: a power and data connector; a device operatively coupled to the power and data connector; wherein the camera shares the power and data connector with the device of the base. Other aspects are described and claimed.

18 Claims, 11 Drawing Sheets

(56) References Cited

U.S. PATENT DOCUMENTS

| | | | | |
|---|---|---|---|---|
| 2004/0120703 | A1* | 6/2004 | Dirisio | G03B 9/04 396/493 |
| 2005/0151042 | A1* | 7/2005 | Watson | F16M 11/14 248/226.11 |
| 2010/0259619 | A1* | 10/2010 | Nicholson | H04N 5/2251 348/158 |
| 2011/0193943 | A1* | 8/2011 | Campbell | F16M 11/045 348/46 |
| 2012/0243200 | A1* | 9/2012 | Sutton | G03B 15/02 362/11 |
| 2015/0043200 | A1* | 2/2015 | Wilson | F21S 9/035 362/145 |
| 2016/0119516 | A1* | 4/2016 | Clearman | G03B 17/561 348/373 |
| 2016/0313114 | A1* | 10/2016 | Tohme | H04N 13/239 |
| 2017/0026555 | A1* | 1/2017 | Hoyda | G03B 17/561 |
| 2017/0235213 | A1* | 8/2017 | Clearman | G03B 17/561 396/428 |
| 2017/0272626 | A1* | 9/2017 | Harrison | H04N 5/2252 |

* cited by examiner

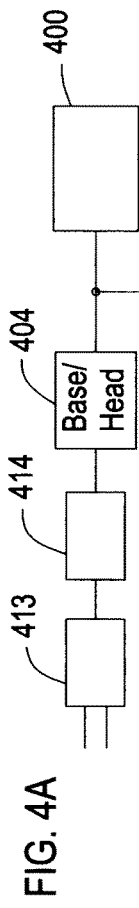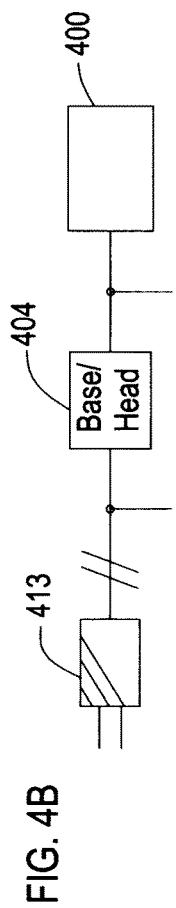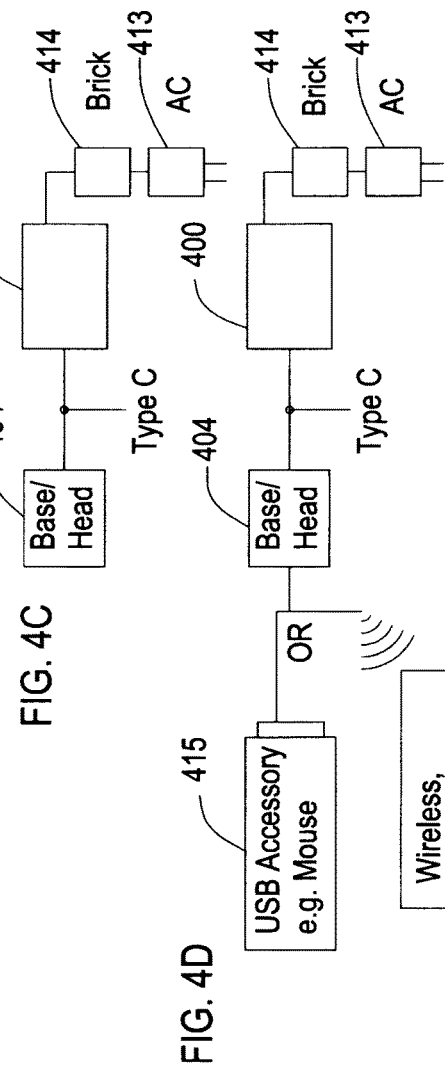

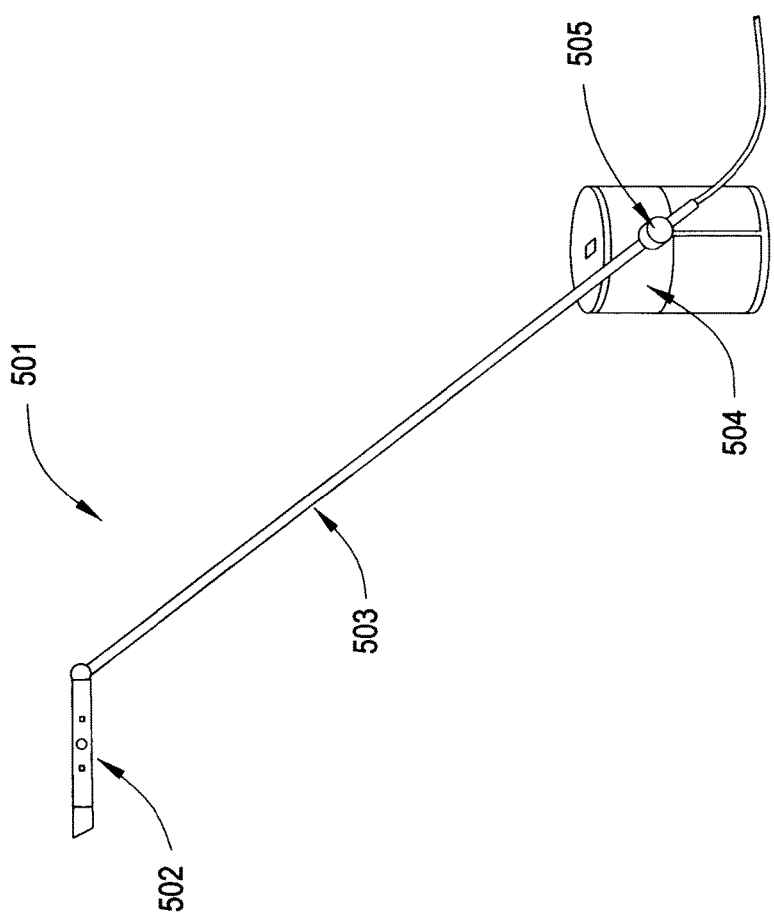

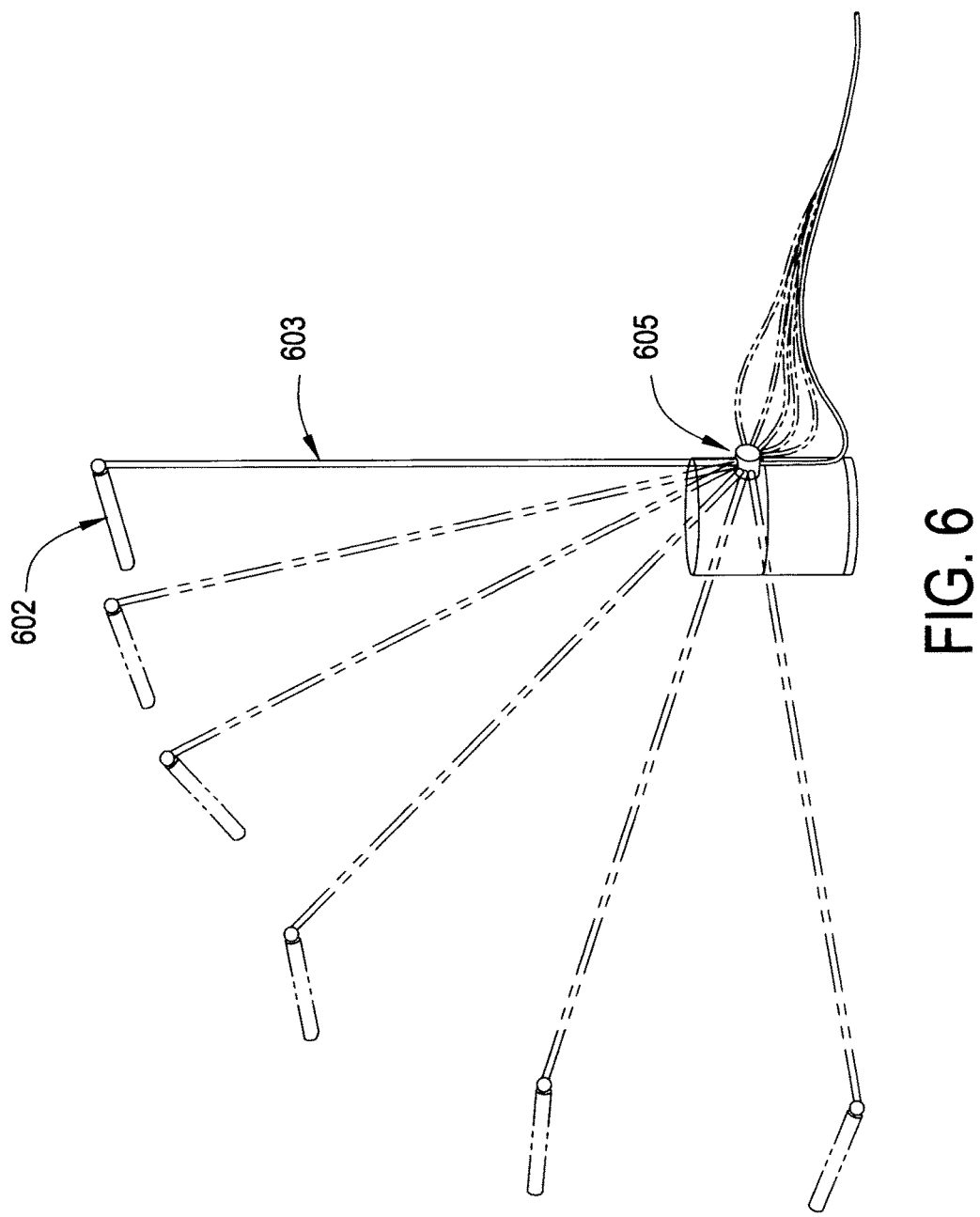

US 10,216,068 B2

CAMERA AND TASK LIGHT ON ADJUSTABLE ARM AND WEIGHTED BASE

BACKGROUND

Cameras are commonly embedded inside a variety of information handling devices (e.g., personal computers, laptop computers, etc.). These cameras can be utilized to perform an array of functions such as take photos, record video, video chat, document and object sharing, etc. Oftentimes, these cameras are built into a fixed position on the computer monitor bezel, effectively increasing the size of the border around the screen and making it unflattering. In addition, in this fixed position, the camera has a limited range of motion, only being adjustable when the user physically moves the monitor. This can lead to user frustration due to difficulties in attaining a proper camera angle.

Stand alone cameras, such as web-cameras having a stand or clip, often come with a minimalist housing. For example, a camera may be provided that has a small stand to sit on a desktop. Other cameras may be clipped onto a monitor bezel. However, these solutions do not remedy the lack of adaptability of the cameras used with computing devices.

BRIEF SUMMARY

In summary, one aspect provides an apparatus, comprising: an arm; a head that attaches to the arm; the head comprising a camera; and a base attached to the arm; said base comprising: a power and data connector; a device operatively coupled to the power and data connector; wherein the camera shares the power and data connector with the device of the base.

Another aspect provides an apparatus, comprising: an arm; a head that attaches to the arm; and the head comprising a camera; wherein the arm comprises a four bar linkage attached to the head.

A further aspect provides an apparatus, comprising: an arm; and a head that attaches to the arm; the head comprising a camera and a light source; wherein the arm comprises a four bar linkage having a data line that communicates data to the head; and wherein said four bar linkage provides stabilization to the head as the arm moves.

A yet further aspect provides an apparatus, comprising: an arm; a head that attaches to the arm; the head comprising a light source; and a base attached to the arm; said base comprising: a power and data connector; a device operatively coupled to the power and data connector; wherein the light source shares at least power from the power and data connector with the device of the base.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-D) illustrates example system power and data configurations for systems including a camera head and additional devices.

FIG. 5 illustrates an example of a camera head on an adjustable boom and weighted base.

FIG. 6 illustrates an example of the motion of the adjustable boom in relation to the camera head and the weighted base.

DETAILED DESCRIPTION

Figure 1:
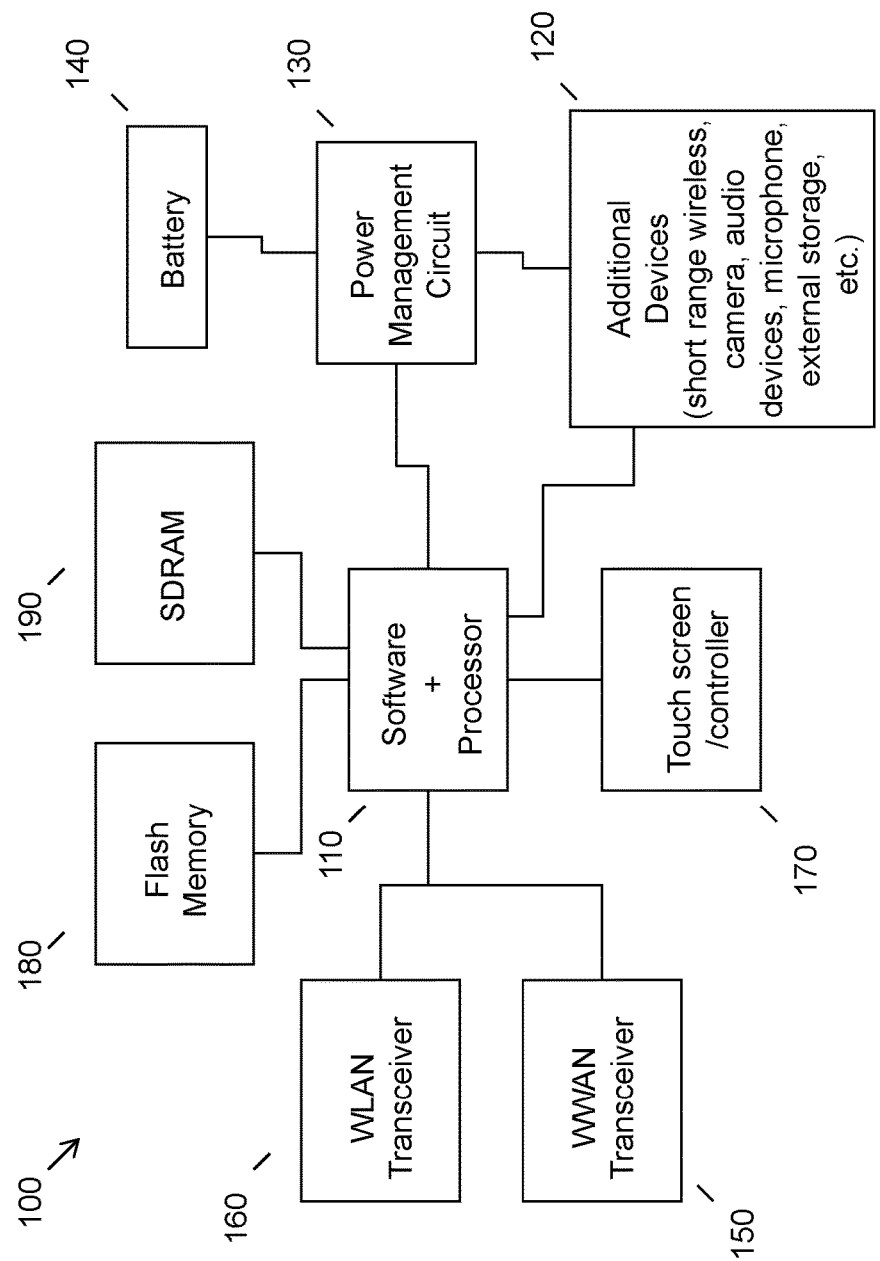
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Picture and video cameras ("cameras") allow users to accomplish a variety of tasks. For example, users can take photos, record videos, engage in video calls, scan documents (with a two dimensional (2D) camera), scan objects (with a three dimensional (3D) camera), etc. Many of these functions occur in concert with use of another device, e.g., a main computer system to which the camera is logically and/or physically coupled.

One conventional approach involves embedding a camera into the bezel of a computer monitor. However, an embedded camera lacks adjustability because it is fixed into the bezel of the monitor. Moreover, although existing 2D and 3D cameras can be used to scan documents or objects, these cameras tend to be formed as a clip-on camera that is not ideal for these tasks, since the user would have to hold the camera in order to position it above the desktop for scanning or reposition the camera during object scanning.

Moreover, an embedded camera creates a variety of aesthetic and functional problems. For example, an embedded camera in the border of a computer screen increases the size of the border around the screen, creating a bulky and unflattering appearance of the monitor. Furthermore, when users have dual monitor screen setups, but only a single monitor has a camera, the two screens may be of different size and/or appearance because the borders are different heights, which is also not aesthetically pleasing. In addition, in a dual monitor screen setup, if both screens have a camera, one of the cameras becomes functionally redundant.

These technical issues present problems for users wanting to have acceptable image quality from a camera used in conjunction with a computer system. Often the image quality suffers because adjusting an embedded camera to a desirable angle may be difficult. Adjusting the computer monitor so that the embedded camera is positioned at the appropriate angle is inconvenient for the user, particularly for cameras used in conjunction with desktop monitors that have a very limited range of motion. This makes it difficult to focus the camera on a specific object. Providing a stand alone camera that either clips onto a monitor bezel or includes a small tabletop stand also does not offer an adequate solution.

Accordingly, an embodiment provides a device in which the camera is no longer fixed into the bezel of a screen or provided with a stationary tabletop stand, but becomes a multimedia accessory in its own right. An adjustable arm or boom provides for flexible and accurate positioning of a head that includes a camera and a task light.

An embodiment permits a user to achieve the perfect camera angle more easily because the head may be stabilized in a variety of orientations. For example, a user may position the camera behind a monitor stand so that the user can angle the arm or boom to sit above the top edge of the computer screen. In one embodiment, the arm or boom is attached to a weighted base that keeps the camera steady and allows the camera to be cantilevered out away from the base. The weighted base may include additional components, e.g., audio speakers, power and data ports, etc., as further described herein.

In an embodiment, the head that includes a camera, a task light, and/or other elements is stabilized about a reference, such as a horizontal or vertical plane. In an embodiment, a four-bar type linkage provides stabilization to the head, as further described herein.

In an embodiment, the arm or boom may be attached or attachable to another element. For example, the arm or boom may extend from a housing for a display panel. The arm may extend from the monitor or display housing, a dock of an all-in-one computing device, or other element so that the user can angle the arm or boom about the display housing, dock or other element.

In an embodiment, the arm may terminate in a clip attachment. The arm may therefore be attached to another object, for example a monitor, etc., such that the user can angle the arm or boom to about the display housing.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a camera. System 100 often includes a touch screen or touch surface 170 for data input and display/rendering. System 100 also typically includes various memory devices, for example flash memory 180 and SDRAM 190.

Figure 2:
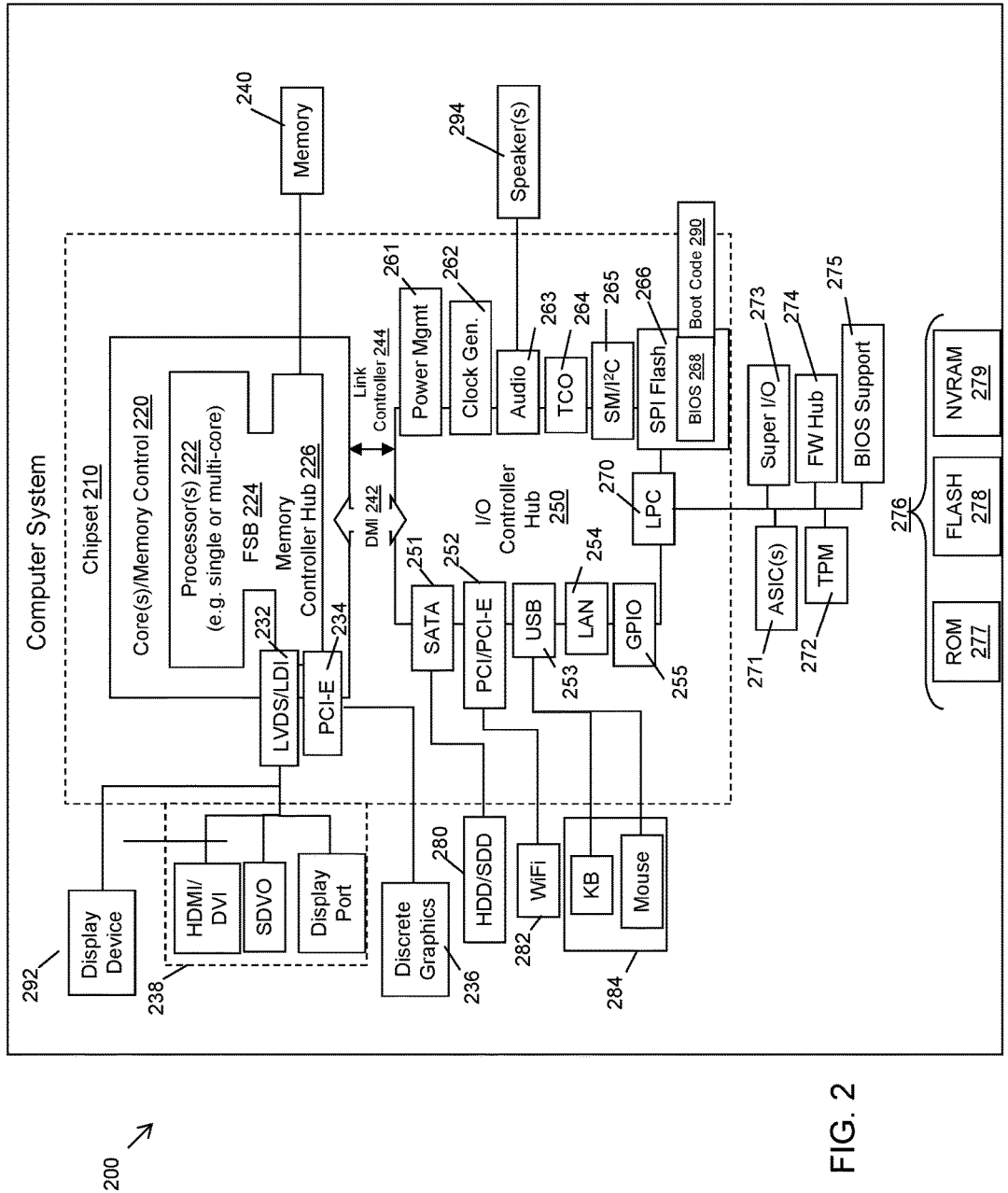
FIG. 2 illustrates another example of information handling device circuitry.

FIG. 2 depicts a block diagram of another example of information handling device circuits, circuitry or components 200. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system 200, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Device circuitry, as for example outlined in FIG. 1 or FIG. 2, may be used in devices such as tablets, smart phones, personal computer devices generally, and/or other electronic devices that users may employ in connection with a camera, a task light or other devices, as described herein. For example, the circuitry outlined in FIG. 1 may be implemented in a tablet, smart phone or hybrid computing system to which a camera is attached, wired or wirelessly, or some or all of the circuitry may be included in a camera head or base component, as further described herein. In contrast, often the circuitry outlined in FIG. 2 is implemented in a personal computer, e.g., a laptop or desktop personal computer to which the camera and/or base component attaches, again via a wired or wireless connection.

Figure 3:
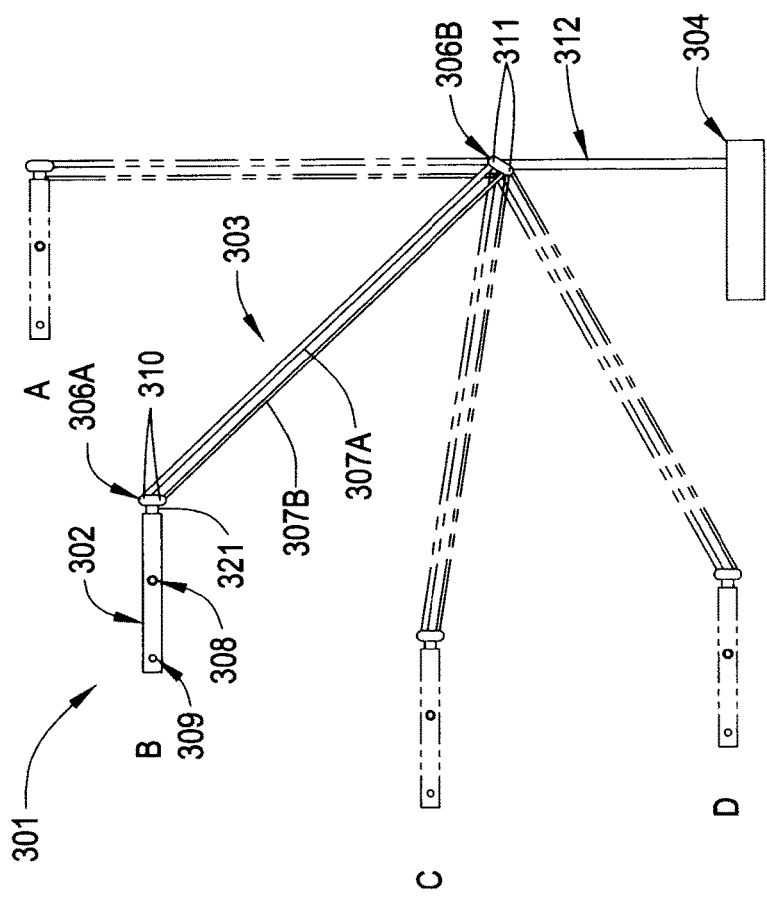
FIG. 3 illustrates an example of the motion of a camera head attached to a weighted base by an arm.

Referring now to FIG. 3, a system 301 is illustrated in which a head 302 is attached to an arm 303, which is in turn connected to a base 304, e.g., using a vertical stand element 312. The arm 303 may be a closed chain or four-bar type linkage comprised of two long bars 307A, 307B that are attached or bookended by two short bars 306A and 306B, as shown in FIG. 3. The two long bars 307A, 307B run substantially parallel to one other and are connected to the two short bars 306A and 306B by four hinged joints, collectively indicated at 310 and 311, i.e., a hinged joint at each end of each short bar 306A, 306B.

A short bar, e.g., short bar 306B, may be fixed to the stand element 312 and in turn attached to the two long bars 307A and 307B of the arm 303. In an embodiment, an attaching block or element 321 of the head 302 may be connected to the other short bar 306A. This four-bar type linkage of the arm 303 allows for the orientation of the head 302 to remain constant in the horizontal plane, as shown, while the arm 303 is tilted up and down. Four example orientations A, B, C, and D are illustrated in FIG. 3. As shown, the head 302 remains horizontal in each orientation due to the four-bar type linkage used for the arm 303.

In an embodiment, the arm 303 may be tilted completely vertically, e.g., as in position A, and through a variety of horizontal positions, e.g., positions B, C and D, without changing the horizontal attitude of the head 302. Thus, a user may change the height of the head 302 by moving the arm 303 without disrupting the level attitude of the head 302 and camera 309 disposed therein.

Moreover, in an embodiment the head 302 may be adjusted about the attachment point with the arm 303. For example, in an embodiment, another hinge point exists at the attaching block or element 321 that allows the head 302 to be adjusted from a horizontal position to a vertical position (not illustrated in FIG. 3). Such a vertical orientation allows the camera 309, located in the head 302, to capture images (e.g., picture and/or video data) in a portrait setting rather than a landscape setting or vice versa. That is, the four bar linkage would still operate the same, maintaining the vertical orientation.

The elements of the head 302, e.g., the camera 309, a task light 308, etc., may share power and data connections with other devices in the system, including the base 304 (and devices included with the base, e.g., wireless communication devices, speakers, etc.) as well as other devices such as a laptop or desktop computer system, and other peripheral devices. In order to accomplish this, various circuitry configurations may be utilized, as outlined in the examples of FIG. 4(A-D).

Shown in FIG. 4A is an embodiment in which an alternating current (AC) power 413 is connected from a primary AC power or commercial power supply to a direct current (DC) converter or DC brick 414. The DC power supply from the DC brick 414 is provided to the base/head 404, e.g., head 302 of FIG. 3. The base/head 404 in turn comprises a power and data connector, e.g., a USB type C connector as shown, that communicates data power between the base/head 404 and a device such as a personal computer (PC), illustrated by way of example as a laptop computer 400 in FIG. 4(A-D). The power and data connector of the base/head 404 permits a camera and an LED task light of the base/head 404 to be operatively coupled to the laptop computer 400. The power and data connector illustrated in FIG. 4A may transmit power between laptop 400 and base/head 404. Furthermore, the power and data connector of the base/head 404 may communicate data between the base/head 404 and the laptop computer 400. For example, the laptop computer 400 may contain software that operates the camera and/or the LED task light. Thus, commands issued from the laptop 400 may be communicated via the power and data connector to elements such as the camera and the LED task light in the head, e.g., via a direct connection such as a wire running through the base, through the arm (not illustrated in FIG. 4A) and into the head, or indirectly, e.g., via an interface contained within the base. Thus, the functions of the camera and LED task light may be coordinated via the laptop computer 400.

Illustrated in FIG. 4B is an embodiment in which an AC power supply 413 is converted to DC power at a power and data connector, e.g., an element comprising a USB type C connector, which in turn provides power to the base/head 404. The base/head 404 may comprise a power and data connector such as a USB type C connector that communicates data power and data to the head and to a device such as a laptop 400, as illustrated in this example. As with the illustrated system in FIG. 4A, the device may contain software that may transmit instructional data, e.g., via the USB Type C connector, that commands the functions of the camera and LED task light of the head.

FIG. 4C shows an embodiment in which an AC power source 413 is converted to DC power at a DC power brick 414 and provided to a device such as a laptop 400. The base/head 404 comprises a USB type C connector that communicates power and data between the laptop 400 and the base/head 404. The base/head 404 may thus communicate data to the laptop 400 and receive data from the laptop 400.

In an embodiment, illustrated by way of example in FIG. 4D, the base/head 404 may further be operatively coupled to peripheral devices 415. By way of example, the base/head 404 may be coupled by wire, for example via USB type connector, to a mouse or any USB accessory. By way of further example, the base/head 403 may wirelessly communicate with other devices 415 using a wireless communication protocol such as BLUETOOTH or WIFI/WIGIG communication protocols, i.e., the base/head may include wireless communication devices.

Referring now to FIG. 5, another embodiment may comprise an adjustable camera system 501 having a head 502 attached to a boom 503 that is mounted to a base 504. The boom 503 may be secured to the base 504 at a hinge containing element 505.

As described herein with respect to FIGS. 3 and 4(A-D), wiring may extend from the boom 503 at an opposite end to a head 502 that includes a camera, a task light and/or other elements. As outlined in the examples of FIG. 4(A-D), this wiring may communicate power and/or data between the head 502 having the camera (and may include other components, as further described herein) and another device, e.g., a personal computer, as well as a commercial power source. The wiring alternatively may terminate in the boom 503 at the base 504, e.g., via transit through the hinge containing element 505. In such case, the head 502 may include an internal power supply (e.g., rechargeable battery) and communicate data (e.g., image data) to and from the base 504 and/or another system wirelessly, e.g., via near field communication, short range wireless communication, wireless Internet communication, etc. As may be appreciated, the wiring may connect the head 502 and the base 504, e.g., via traversing an internal portion of the boom 503. The wiring connecting the head 502 and the base 504 may terminate in the base 504, e.g., if the base 504 is a stand alone module with a power source and/or contains a separate connection to another system, e.g., personal computer, and/or a commercial power source. Furthermore, a combination of the foregoing communication techniques may be utilized to supply power and/or data connectivity between the head 502 and the base 504 and/or some other device or system, e.g., personal computer.

FIG. 6 illustrates an example embodiment outlining the possible movement of the boom 603 and head 602. In an embodiment, the hinge containing element 605 may rotate as indicated in either clockwise or counterclockwise direction, correspondingly adjusting the boom 603 up or down. In an embodiment, as the boom 603 is adjusted up or down, the head 602 may also be adjusted, as further described in connection with FIG. 7. While the hinge containing element 605 illustrated in FIG. 6 operates to rotate about a single axis, a multi-axis connection point may be included. Such multi-access connection point may replace hinge containing element 605 particularly if wiring is not provided through an internal cavity of the boom 603 to the head 602. Thus, a user may make gross adjustments to the height of the head 602 by moving the boom 603.

The boom 603 stays in place due to a force (e.g., friction) between elements of the hinge containing element 605. Thus, if a user repositions the boom 603 it will remain in that position until repositioned. In an embodiment, the boom 603 may be telescoping as well.

Figure 7:
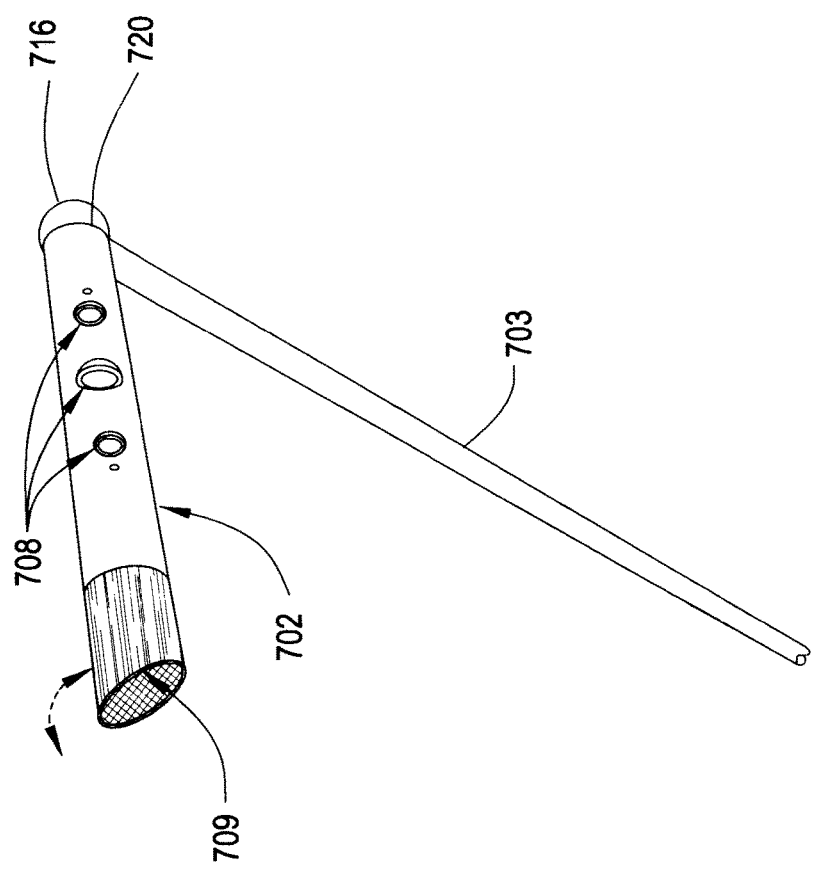
FIG. 7 illustrates an example configuration of a camera head on a boom.

Referring now to an example illustrated in FIG. 7, the head 702 is attached to a ball 716 at the end of the boom 703. In an embodiment, the head 702 may rotate in any direction by virtue of inclusion of an end face 720 that is complementary to the shape of the ball 716. In an embodiment, the head 702 may further freely rotate and adjust in any direction about the ball 716 because the head 702 may be removable from the ball 716, e.g., secured to the ball 716 by the use of magnets. Magnets present inside the ball 716 and head 702 permit the head 702, when end face 720 of the head 702 is brought proximate in the concave portion of the ball 716, to be secured to the ball 716 in a fixed orientation. In such an embodiment, the head 702 may be wirelessly connected to another device or system.

In an embodiment, the head 702 may be hard wired to another device or system via a wire that traverses through the boom 703 and ball 716, via a wire that traverses through the boom 703 but exits prior to the ball 716, or via a wire that extends along an outer periphery of the boom 703 and the ball 716. An embodiment may be externally wired, e.g., so that the head 702 can move freely on the ball 716, but a wire leaves the head 702 and reattaches to the boom 703 just below the ball 716.

In an embodiment, the head 702 may not be removable from the ball 716 or boom 703.

When secured onto the ball 716 and in a wired configuration, the head 702 may make a connection with at least one wire that runs through the boom 703. In an embodiment, the head 702 may not contain a power source and derive its power from a wired connection via the boom 703 or like connection. In an embodiment, the head 702 may contain a rechargeable battery and the wire may provide power to the battery. In an embodiment, the rechargeable battery may provide power to temporarily operate various electronic systems in the head 702 (e.g., video camera, microphone, LED light, etc.) while the head 702 is not connected to a power source. In an embodiment, when removed, the head 702 may be reattached to the boom 703 or may be connected onto another boom 703 or device.

In a wireless configuration, the head 702 may contain a rechargeable that is wirelessly charged. The head 702 may likewise communicate data via a wireless mechanism, as described herein.

In an embodiment, the head 702 may contain a video camera 709. The video camera 709 may be used to perform a variety of functions such as, but not limited to, record videos, take pictures, operate as a web-camera in connection with a video conference/chat application, scan various documents or images, etc. In an embodiment, the video camera 709 transmits data through wires that extend through the boom 703. In another embodiment, the video camera 709 may wirelessly transfer data from the camera 709 to the base or to a computer or other device. In an embodiment, the camera 709 may be a 2D or 3D camera, and may be used in connection with a gesture control system (e.g., provided by the base 504 or other coupled device or system, etc.).

An embodiment may include a 2D camera 709 that is repositioned about the boom 703 such that the camera 709 is more easily stabilized for document scanning. Furthermore, for object scanning, a 3D camera 709 may be included and repositioned using the boom 703 to more easily obtain images of the object.

In an embodiment, the head 702 may contain a microphone that captures audio data, e.g., audio data in connection with video data captured by the camera 709.

In an embodiment, the head 702 may contain LED task lights 708. The LED task lights 708 provide additional lighting capability to the head 702.

In an embodiment, the head 702 may contain an audio speaker for audio output, e.g., audio data used in connection with video data provided in a video conference call, etc. The audio speaker may be omitted in an embodiment. In any of the embodiments, a user may rotate the head 702 about an axis coincident with the long axis of the head 702, as indicated by the dashed arrow in FIG. 7.

In an embodiment, the head 702 may be adjusted to a vertical or horizontal orientation. In certain situations, such as in video-conferencing or video chatting, for example, a portrait style image or video recording may be desirable. In addition, oftentimes, when video is recorded while a camera is in a horizontal orientation and then subsequently rotated to a vertical position, the image resolution may decrease. As such, a vertical orientation of the camera 709 may be preferable because it preserves the resolution of the image. Vertical video may be used for video chat applications. In an embodiment, the ball 716 on the boom 703 may be turned or rotated itself in order to achieve a wide variety of positions rather than reorienting the head 702.

Figure 8:
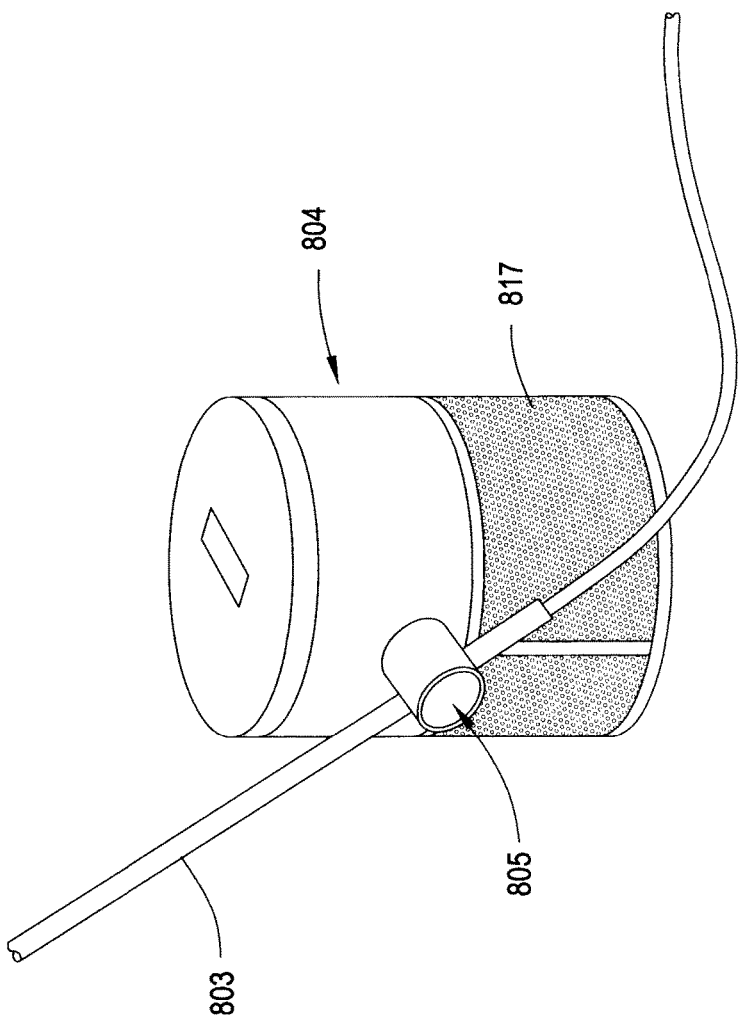
FIG. 8 illustrates an example configuration of a weighted base securing a boom.

Referring now to FIG. 8, the base 804 may be weighted in order to provide stability and support for the head and boom 803. In an embodiment, the base 804 is connected to the computer by a wire or cable. Power and data connections may run through the base 804 to another system or, if the base includes processing and computing functionality, the power and data connections may terminate in base 804, which is in turn supplied with power and data connectivity, e.g., data connectivity to a broader network such as a home network, the Internet, etc.

In an embodiment, the base 804 may secure the boom 803 at a hinge containing element 805. In an embodiment, the hinge containing element 805 may be a detachable hinge containing element 805 so that it may be pulled out from or otherwise removed from the base 804. In an embodiment, one end of the detachable hinge containing element 805 (e.g., the end of the detachable hinge containing element 805 that enters the base 804) may contain a power and data connector, e.g., a USB-C port, such that the hinge containing element 805 may be plugged into the base 804. As may be appreciated, the boom 803 and a detachable hinge containing element 805 (or like connector) may be plugged into different systems other than the base 804. For example, the hinge containing element 805 may be plugged into a receiving port in another computer, another base, a monitor stand, or the like.

In an embodiment, the base 804 may act as a dock and contain other components, e.g., contain a port replicator, a wireless communication device, etc. As an example, the port replicator may allow a number of devices such as a printer, keyboard, and additional monitor to connect to the base 804. In an embodiment, the base 804 may contain other components, e.g., a storage drive, removable storage cards for storing images, etc.

The base 804 may contain a speaker 817. In an embodiment, the base 804 may contain BLUETOOTH connectivity to synchronize with the audio that may be playing on a connected device to allow that audio to be played through the speaker 817. The base 804 may have a volume control feature, for example, located on the top surface, to allow a user to adjust the audio that is coming through the speaker 817 on the base 804. The base 804 may contain a button, or a switch, or other user interface that allows a user to turn the light 808 on and off, utilize the camera 809 to capture image data, adjust audio output via the speaker 817, or otherwise control the head 802 components. Alternatively or in addition to the foregoing, control of elements of the head may be implemented locally, i.e., via an interface provided on the head that permits a user to control the camera, light, microphone, etc. Also, control of elements of the head may be implemented remotely or in a distributed fashion, for example via issuance of control data from another device, e.g., a laptop computer.

Figure 9A:
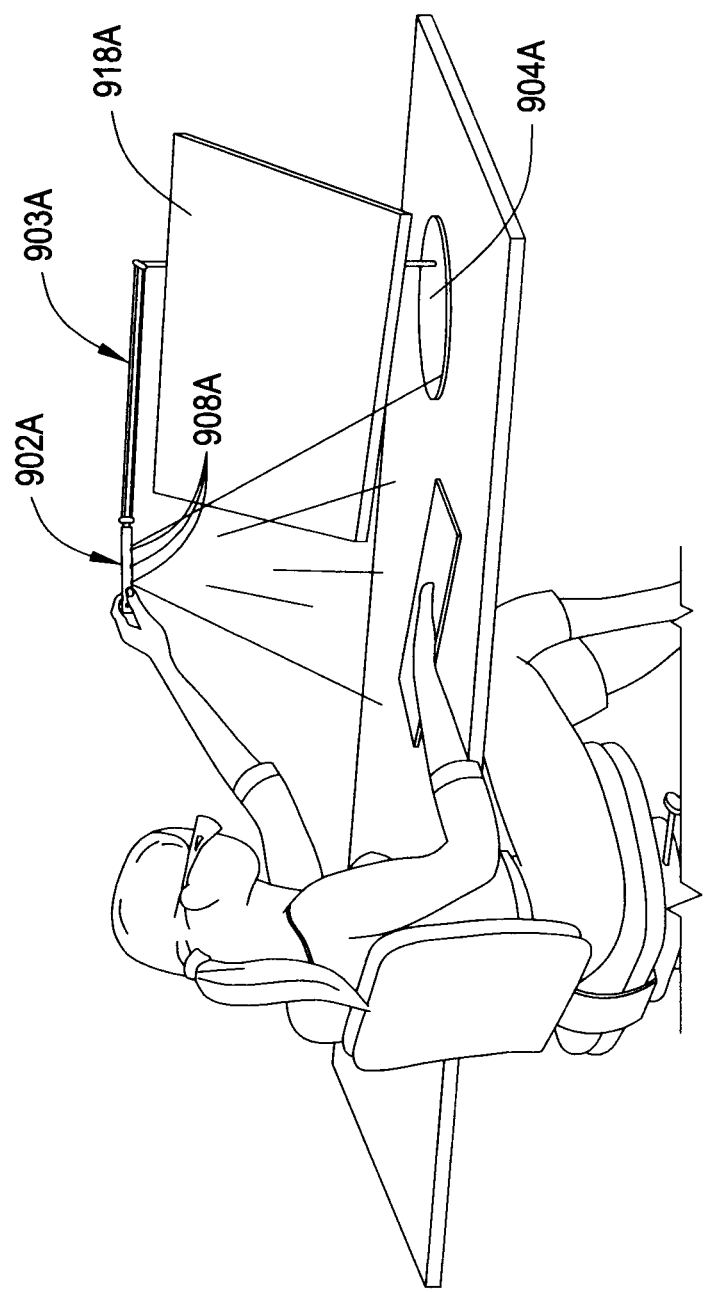
FIG. 9(A-B) illustrates an example configuration of an arm that extends from a display stand.
Figure 9B:
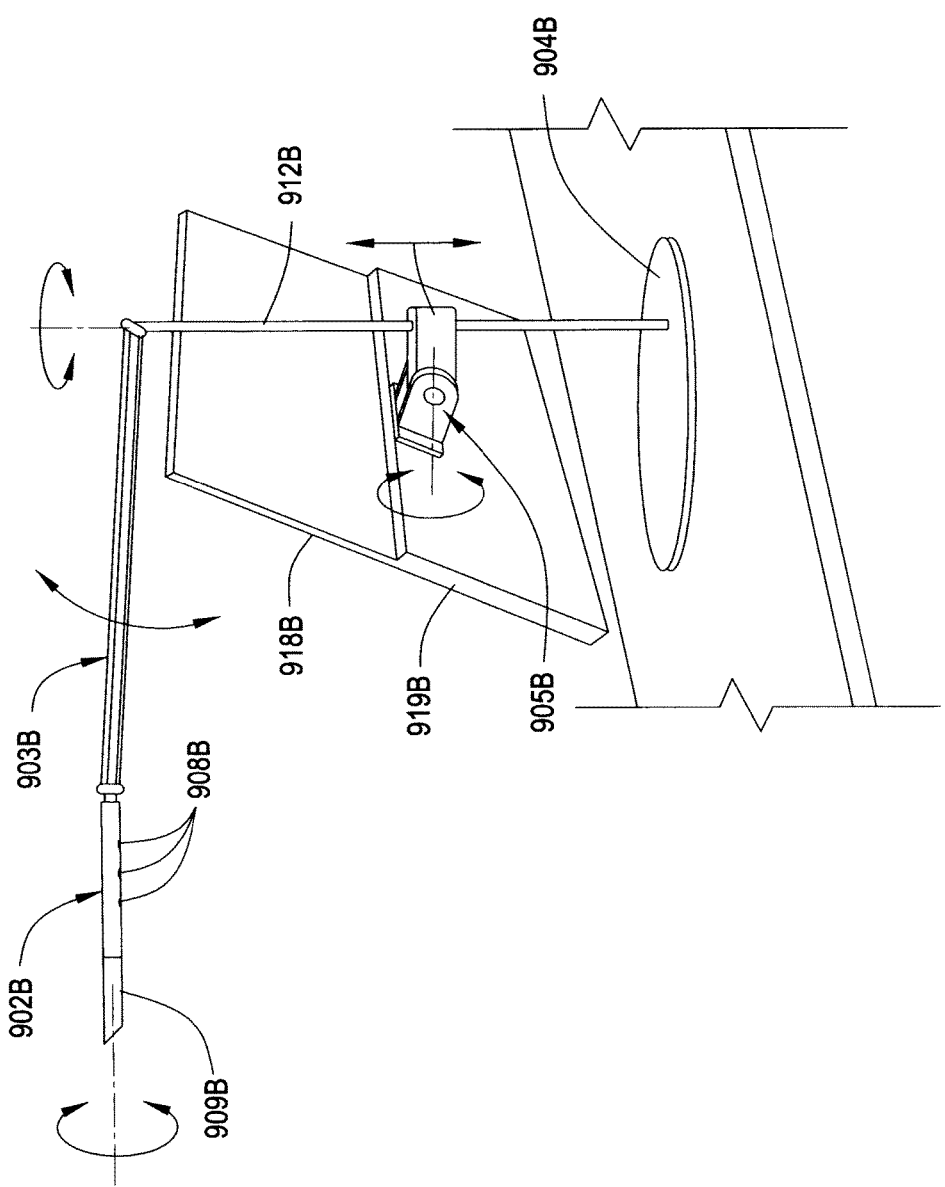

Illustrated in FIG. 9(A-B) is an example configuration of an arm that extends from a display stand. FIG. 9A illustrates a front perspective view in which the arm 903A, which may take the form of a four-bar linkage similar to that described in connection with FIG. 3, extends from a stand (described further with reference to FIG. 9B). The stand in this case acts as a stand for a monitor or display panel 918A, which may be set on a desk top via base 904A.

The arm 903A stabilizes the head 902A due to the four-bar linkage as the arm 903A is moved by a user. Referring to FIG. 9B, as may be appreciated, the arm 903B may be repositioned vertically by movement of the four-bar linkage, as shown by dashed arrow in FIG. 9B, similar to the movement shown in FIG. 3.

The head 902A may include one or more light sources, e.g., LED task lights 908A. In the example illustrated in FIG. 9A, three LED task lights 908A are shown. The LED task lights 908A, as well as other elements of the head 902A, may be positioned within the head 902A at various locations.

As described in connection with FIG. 9A, the arm 903A may be moved about by a user to reposition the functional elements contained within the head 902A. Some of the potential movements of the arm 903A and head 902A are illustrated in FIG. 9B.

FIG. 9B offers a rear, perspective view of the example configuration of an arm that extends from a display stand. The arm 903B may connect to a stand element 912B, which is in turn attached to a base 904B. As with other embodiments, the arm 903B may be attached to a hinge containing element 905B. In this example, the arm 903B is connected to the base 904B via the stand element 912B, i.e., similar to the example illustrated in FIG. 3.

The stand element 912B may be attached to the hinge containing element 905B that is in turn integrated into a monitor or display panel stand 919B. In this example, the monitor or display panel stand 919B supports a removable monitor or display panel 918B. The hinge containing element 905B permits the monitor or display panel stand 919B to be repositioned about an axis of rotation of the hinge of the hinge containing element 905B, as illustrated by the arrow proximate to the hinge containing element 905B in FIG. 9B. The hinge containing element 905*b* may also permit the monitor or display panel stand 919B to be repositioned vertically with respect to the stand element 912B, as illustrated by the double headed arrow proximate to the stand element 912B in FIG. 9B.

The arm 903B may be repositioned about the stand element 912B via rotation about an axis aligned with the stand element 912B, as illustrated by the arrow proximate to the top of the stand element 912B in FIG. 9B. Likewise, the head 902B may be rotated about an axis aligned with arm 903B, as illustrated by the arrow proximate to the end of the head element 902A in FIG. 9B. This permits a user to reposition the arm 903B for side-to-side movements and the head 902B for forwards and backwards movements, independently. Thus, a user may adjust the location of the LED task lights 908B and a camera 909B via repositioning the arm 903B, the head 902B, or a combination thereof.

Figure 10:
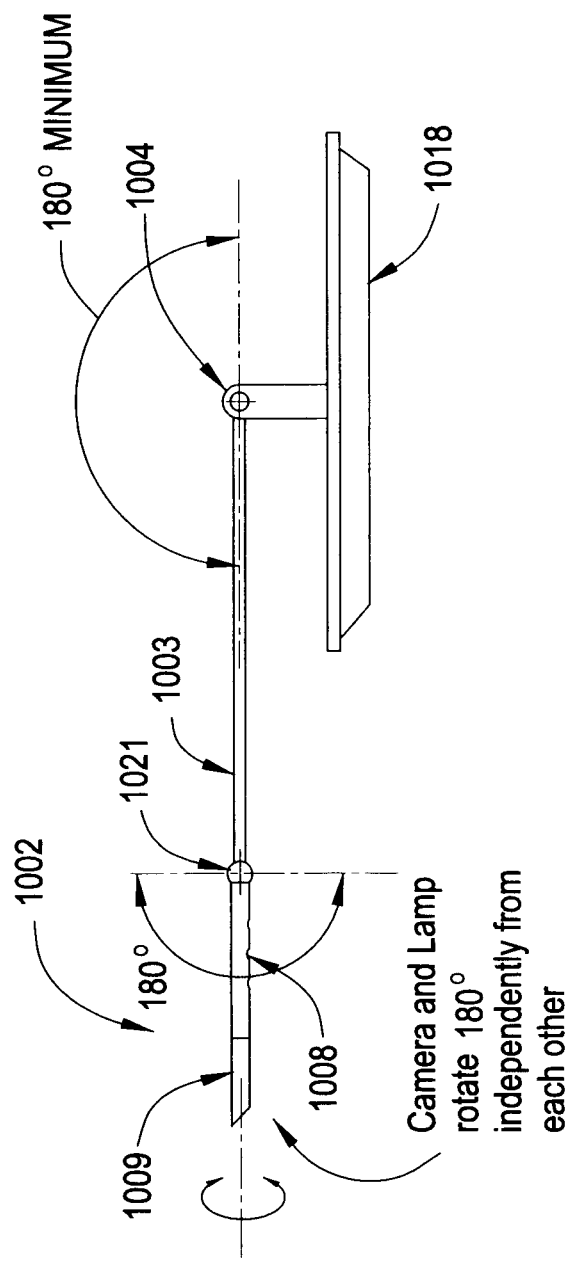
FIG. 10 illustrates a top view of the example configuration of an arm that extends from a display stand.

Additional movements of the example configuration of an arm that extends from a display stand are illustrated in the top view of FIG. 10. Shown in FIG. 10 is the arm 1003 extending outward from the centrally located base 1004, with the understanding that a stand element provides vertical elevation to the arm 1003.

The arm may be rotated in 360 degrees (180 of which are shown for the most likely front-side positions, i.e., in front of the display panel 1018). The head 1002 and thus the camera 1009 and LED task light(s) 1008 also may be repositioned in 360 degrees, independent of the movement of the arm 1003, as illustrated in FIG. 10. The head 1002 may rotate about a hinge included in an attaching or block element 1021 or like arrangement, similar to that described in connection with FIG. 3. For example, such an arrangement may permit the head 1002 to rotate and pass between the long arms of a four-bar type linkage of arm 1003.

The head 1002 may also be rotated about the arm 1003, as illustrated by the arrow in FIG. 10. This again permits the camera 1009 and/or LED task light(s) 1008 to be focused in front and back positions relative to the desktop.

The various embodiments described herein thus represent a technical improvement to conventional cameras used in connection with a computing system or other devices. An embodiment provides for increased flexibility for camera and/or light positioning. Rather than having the user adjust the entire monitor of the screen to achieve a proper camera angle, an embodiment allows a user to adjust a boom and/or a head unit connected or attached to the boom, to achieve the desired camera angle.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   an arm;
   a head having an end face that detachably mates with a ball receiving portion of the arm, a mating connection between the end face and the receiving portion allowing any degree of rotation up to 360 degree rotation of the head;
   the head comprising an integrated camera; and
   a base attached to the arm, wherein the base comprises a circular bottom surface configured to stably support the base on a horizontal surface;
   said base comprising:
   a power and data connector;
   another device operatively coupled to the power and data connector;
   wherein the camera shares the power and data connector with the another device of the base.

2. The apparatus of claim 1, wherein the head comprises a hinge that permits the camera to be reoriented between landscape and portrait orientations.

3. The apparatus of claim 1, further comprising wiring that connects the head to the power and data connector of the base.

4. The apparatus of claim 3, wherein the wiring comprises a power connection between the head and the base.

5. The apparatus of claim 1, wherein the head comprises a light emitting diode (LED).

6. The apparatus of claim 5, wherein the LED receives data and power through the power and data connector of the base.

7. The apparatus of claim 1, wherein the camera receives data through the power and data connector of the base.

8. The apparatus of claim 1, wherein the device of the base is a device selected from the group of devices consisting of a wireless communication device and a speaker.

9. An apparatus, comprising:

an arm;

a base attached to the arm, wherein the base comprises a circular bottom surface configured to stably support the base on a horizontal surface;

a head having an end face that detachably mates with a ball receiving portion of the arm, a mating connection between the end face and the receiving portion allowing any degree of rotation up to 360 degree rotation of the head; and the head comprising a camera.

10. The apparatus of claim 9, comprising a housing, wherein the arm extends from the housing.

11. The apparatus of claim 10, wherein the housing comprises a display panel.

12. The apparatus of claim 11, further comprising a computer system that communicates with the camera.

13. The apparatus of claim 9, wherein the camera comprises a three-dimensional camera.

14. The apparatus of claim 9, wherein the arm comprises a data line that communicates data to the head.

15. The apparatus of claim 14, wherein the head comprises a light source, wherein said data line controls an element of the head selected from the group consisting of the camera and the light source.

16. The apparatus of claim 15, wherein the data line directly controls the light source.

17. An apparatus, comprising:

an arm; and a base attached to the arm, wherein the base comprises a circular bottom surface configured to stably support the base on a horizontal surface;

a head having an end face that detachably mates with a ball receiving portion of the arm, a mating connection between the end face and the receiving portion allowing any degree of rotation up to 360 degree rotation of the head;

the head comprising an integrated camera and a light source.

18. An apparatus, comprising:

an arm;

a head that is operatively coupled to a ball receiving portion of the arm;

the head comprising an integrated camera; and a base attached to the arm, wherein the base comprises a circular bottom surface configured to stably support the base on a horizontal surface;

said base comprising:

a power and USB data connector;

wherein a power and USB data cable are provided through the arm to the head, wherein the camera receives the power and USB data through the cable from the base.

* * * * *